(12) United States Patent
Soldano et al.

(10) Patent No.: US 7,164,589 B1
(45) Date of Patent: Jan. 16, 2007

(54) BRIDGELESS BI-DIRECTIONAL FORWARD TYPE CONVERTER

(75) Inventors: Marco Soldano, El Segundo, CA (US); Maurizio Salato, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/474,712

(22) Filed: Jun. 26, 2006

Related U.S. Application Data

(60) Provisional application No. 60/698,037, filed on Jul. 11, 2005.

(51) Int. Cl.
*H02M 3/335* (2006.01)

(52) U.S. Cl. ............. 363/21.04; 363/21.1; 363/21.08

(58) Field of Classification Search ........... 363/21.04, 363/21.1, 21.08
See application file for complete search history.

(56) References Cited

U.S. PATENT DOCUMENTS 6,577,511 B1 * 6/2003 Yamaguchi et al. ..... 363/21.07
6,781,853 B1 * 8/2004 Xu et al. ................. 363/21.06
6,788,553 B1 * 9/2004 Jin et al. ................. 363/21.06
6,912,141 B1 * 6/2005 Konno ........................ 363/49

* cited by examiner

*Primary Examiner*—Bao Q. Vu
(74) *Attorney, Agent, or Firm*—Ostrolenk, Faber, Gerb & Soffen, LLP

(57) ABSTRACT

A circuit is provided for converting power from an AC power source to DC power. The circuit including bi-directional switches capable of conducting and blocking a current flow in both directions. One or more control switches are coupled to a bi-directional switch to enable and disable the current flow through the bi-directional switch, the control switches are controlled by a signal voltage to turn a bi-directional switch ON by discharging a threshold voltage on one of the bi-directional switch gates and turning a bi-directional switch OFF when the threshold voltage is not discharged by the control switches. Additionally, the circuit includes a transformer having one or more primary windings and a secondary winding, each primary winding being coupled to one of the bi-directional switch sources. The current flow through the primary winding is disabled when the current flow through the corresponding bi-directional switch source is disabled.

22 Claims, 3 Drawing Sheets

BRIDGELESS BI-DIRECTIONAL FORWARD TYPE CONVERTER

CROSS-REFERENCE TO RELATED APPLICATION

This application is based on and claims the benefit of U.S. Provisional Application Ser. No. 60/698,037, filed on Jul. 11, 2005, entitled BRIDGELESS BIDIRECTIONAL FORWARD TYPE CONVERTERS, to which a claim of priority is hereby made and the disclosure of which is incorporated by reference.

BACKGROUND OF THE INVENTION

The present invention relates to AC-DC power conversion and more particularly to the use of bi-directional devices and elimination of losses due to unidirectional devices used in conventional front-end rectifier bridges.

A standard off-line AC-DC power conversion stage is usually constituted by an input or front-end rectifier bridge followed by an isolated switch mode DC—DC conversion stage. This DC—DC stage is actually a DC-AC-DC stage, in which the high frequency AC provides isolation by means of a high frequency transformer. The main reason for using the front-end rectifier bridge, which is a significant source of power losses, is that commonly available power switches are unidirectional, i.e., can block only unipolar voltage.

Similar disadvantages, including lower efficiency, high component counts, overall system complexity, and higher cost may be found in other systems using the multistage approach, e.g., circuitry using input bridge, PFC and isolated DC—DC and those using bridgeless PFC and isolated DC—DC.

SUMMARY OF THE INVENTION

It is an object of the present invention to provide a bi-directional forward type converter that allow bridgeless, direct and isolated AC-DC conversion.

It is another object of the present invention to enable higher efficiency in the AC-DC converter by eliminating the input bridge and providing a single stage AC-DC function.

It is a further object of the present invention to enable implementation of power factor correction techniques, provide higher efficiency, circuit simplification, fewer circuit components, and hence lower circuit cost.

In accordance with the present invention a circuit for converting power from an AC power source to DC power is disclosed. The circuit includes a bi-directional switch, the bi-directional switch being capable of conducting and blocking current in both directions; a transformer having a primary and a secondary, the primary being coupled in series with the bi-directional switch.

The circuit of the present invention further comprises a first control switch connected to the bi-directional switch to turn ON the bi-directional switch to allow current to flow through the bi-directional switch and in the transformer primary in a first direction and a second control switch to turn ON the bi-directional switch to allow current flow through the bi-directional switch and in the transformer primary in a second direction opposite the first direction; further comprising a rectifier coupled to the transformer secondary for providing the DC power.

The circuit of the present invention further comprises a clamp circuit for clamping a voltage to one gate of the bi-directional switch at a threshold voltage to turn the bi-directional switch OFF, the first and/or second switch being controlled by a signal voltage to turn the bi-directional switch ON by discharging the threshold voltage on the one gate and turning the bi-directional switch OFF when the threshold voltage is not discharged by the second switch.

In one embodiment of the invention, the bi-directional switch has first and second gates and first and second sources associated with respective ones of the gates. The circuit is used with first and second diodes each having an anode connected to a respective gate and a cathode to the respective source.

According to one embodiment of the invention, there is provided a switching circuit for providing power to a reactive load impedance, the circuit comprising: a first bi-directional semiconductor switch of the depletion mode type having two source terminals and a respective gate terminal associated with each source terminal, the first switch being turned OFF if at least one gate terminal is at a negative threshold voltage with respect to its source terminal; a second control switch coupled between one gate terminal and the respective source terminal to allow control of a voltage applied to the one gate terminal; a reactive load impedance in series with the source terminals of the first switch, the reactive impedance and source terminals of the first switch being adapted to be connected across a voltage source; a clamp circuit for clamping a voltage to the one gate at a threshold voltage to turn the first switch OFF, the second control switch being controlled by a signal voltage to turn the first switch ON by discharging the threshold voltage on the one gate of the first switch and turning the first switch OFF when the threshold voltage is not discharged by the second switch.

In yet another embodiment of the invention two of the above-described circuits are used, thereby using two bi-directional switches. The circuits are connected through the transformer primary.

Other features and advantages of the present invention will become apparent from the following description of the invention that refers to the accompanying drawings.

DETAILED DESCRIPTION OF EMBODIMENTS OF THE INVENTION

Figure 1:
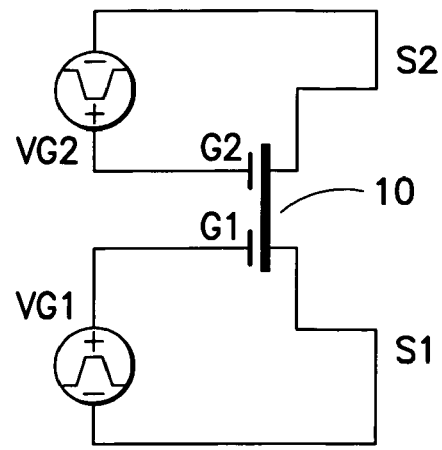
FIG. 1 is a circuit diagram of a normally-ON bi-directional depletion mode switch.

The present invention makes use of normally ON bi-directional switches in AC-DC power converters. These switches are capable of conducting and blocking current in both directions. As shown in FIG. 1, a typical implementation 10 of the bi-directional switches uses two control pins or gates G1 and G2 to control the status of the device.

Since the device is a normally ON or depletion mode device, to keep the device 10 in an OFF state, a negative bias must be applied between the gate and the source. If one of the gates G1 or G2 is negatively biased, the device 10 is OFF and will block current passage from one source S1 of the device to source S2. If each gate is tied to its source or positive with respect to its source, then the device is ON.

Figure 2:
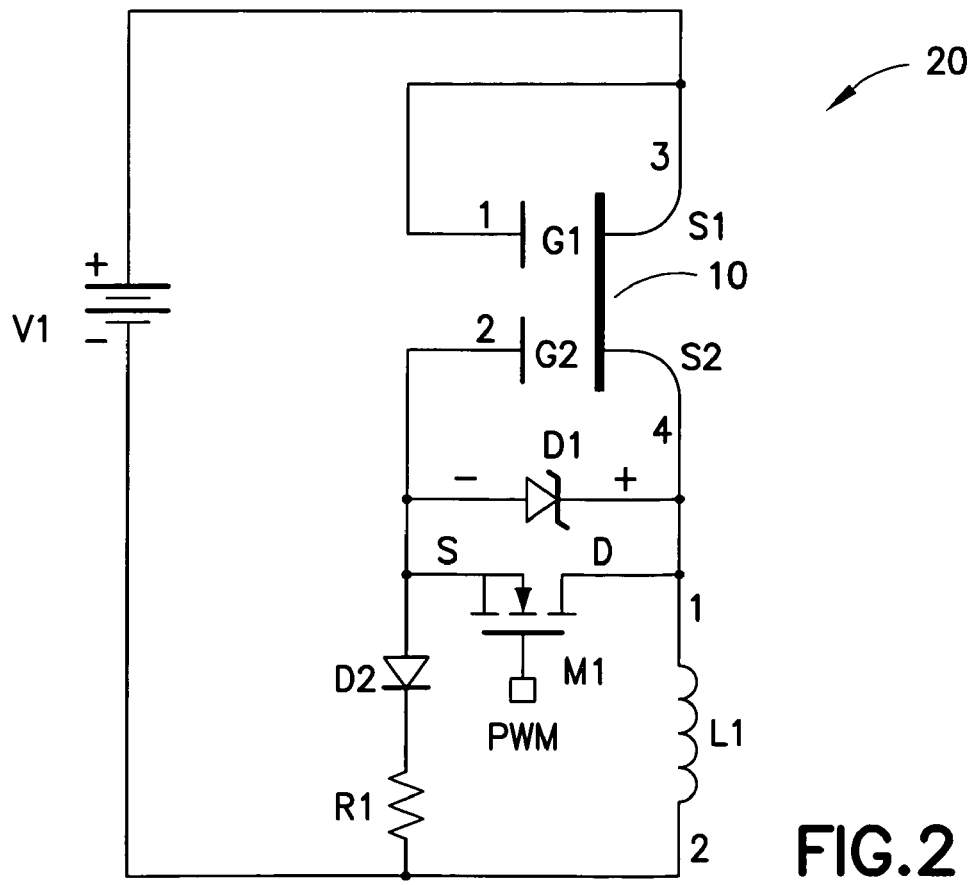
FIG. 2 is a circuit diagram of a circuit of a normally-ON depletion mode switch driving through a series reactive impedance to illustrate principles of operation.

FIG. 2 shows a circuit 20, incorporating the device 10 (FIG. 1). The circuit 20 illustrates the basic principle of the present invention, namely the use of a reactive element as series impedance for driving a normally ON depletion mode transistor.

In the circuit 20, the normally ON device 10 is coupled to a DC power source voltage V1 that is initially applied to an inductor L1, whereby the current starts linearly rising. The power source voltage V1 is also applied to a series connection of a Zener diode D1, that clamps the voltage to the maximum allowable voltage on the gate of the device 10, and a resistor R1 and diode D2. The resistor R1 drops the remaining voltage and limits the current into the driving network. A low voltage diode or a properly driven switch D2 is positioned in series between the diode D1 and the resistor R1. The diode D2 is necessary to ensure that the negatively charged gate capacitance of the gate G2 is not discharged through the transformer winding L1. The Zener diode D1 and a control switch M1, e.g., a MOSFET, which is shown to be connected in parallel with the diode D1, may be replaced by a single low voltage, low current device.

In the shown configuration, circuit 20 has two possible states, which are:

1. State I, switch M1 is OFF: When voltage V1 reaches the threshold voltage of the device 10, the switch M1 is kept OFF, turning the whole device 10 OFF. The Zener diode D1 clamps the gate G2 negative with respect to source S2.

2. State II, switch M1 is ON: When the small low voltage transistor M1 is turned on, the gate G2 of the device 10 is discharged and maintained discharged, therefore the device 10 is ON.

Figure 3:
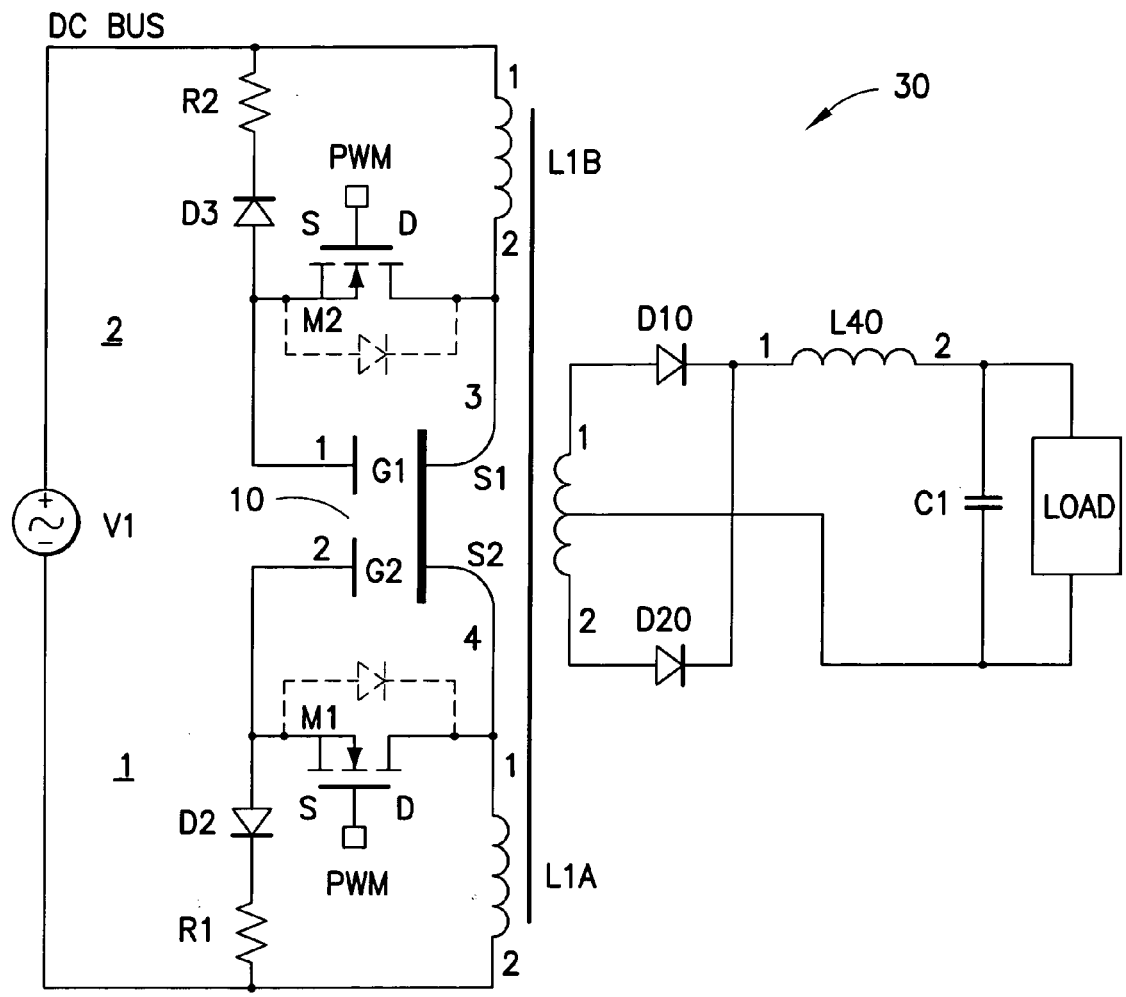
FIG. 3 is a circuit diagram of a single bi-directional switch, bridgeless forward converter according to one embodiment of the present invention.

A forward converter circuit 30 implementation of the present invention is illustrated in FIG. 3. The circuit 30 is the bi-directional layout extension of the basic structure of the circuit 20. The circuit 30 is designed using two transformer primary impedances or inductors L1 and L2 in series with each source S1 and S2 of the device 10. The transformer primary winding is split into windings LA and LB so as to properly generate the driving voltages on the device 10 when the bipolar voltage (AC) V1 is applied to the DC bus. The device 10 can be a GaN High Electron Mobility Transistor (HEMT) device.

Control switches M1 and M2 must be capable of clamping the voltage at the gate maximum rating of the device 10. During the positive half of the AC sine wave from AC source V1, the switch M1 will drive the device 100N and OFF (e.g., in accordance with, e.g., a PWM signal), while the switch M2 reverse conducts the bias current provided by the resistor R2 through its body diode (shown in dashed lines), thereby shorting the gate G1 to the source S1 of the device 10.

During the negative half cycle of the sine wave, the switch M2 will switch the device 100N and OFF (in accordance with a switching signal, e.g., PWM signal) and the switch M1 will be rendered ineffective, keeping the gate G2 ON.

The switches M1 and M2 may be driven in parallel. The system structure of the invention allows the one properly biased switch M1 or M2 to drive the device 10. It is understood that insulated driving techniques or bipolar HV technologies have to be used to properly drive the switches M1 and M2.

Rectifier D10 and D20 provide full wave rectification of the output from the secondary. Inductor 40 and capacitor C1 provide output filtering.

Figure 4:
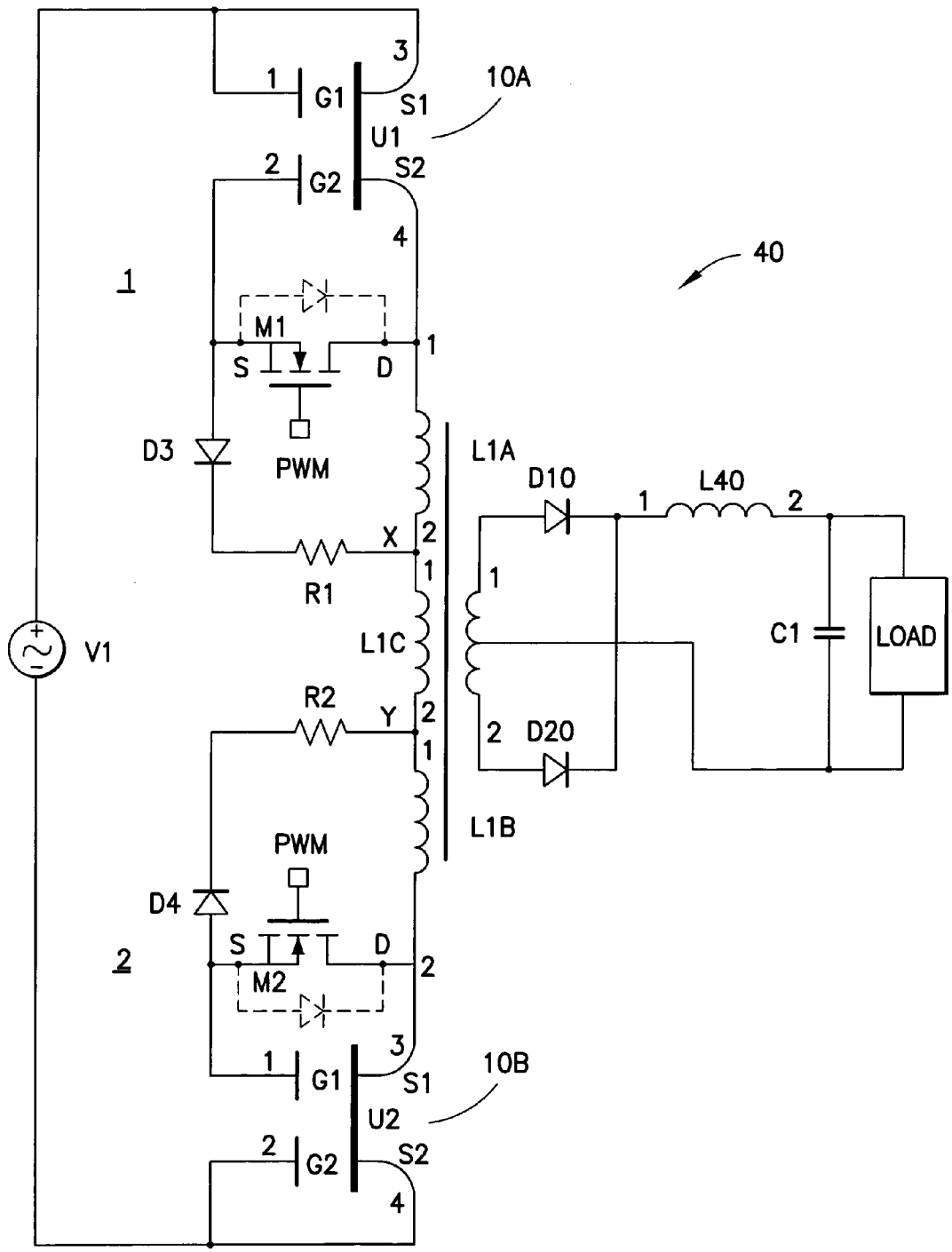
FIG. 4 is a circuit diagram of a two bi-directional switch, bridgeless forward converter according to another embodiment of the present invention.

FIG. 4 illustrates an alternative structure of a forward converter circuit 40 implementation using the bi-directional layout of the present invention.

In circuit 40, a primary transformer winding L1A, L1B, L1C is designed with two low voltage taps X and Y. Similar structures (M1 and M2 low voltage MOSFETS) are used. The circuit 40 has the advantage of using low voltage current limiting resistors R1, R2 for gate bias. However, two GaN HEMTs 10A, 10B are required. The secondary circuit is similar to the circuit of FIG. 3.

During the positive AC half cycle, switch M2 (when turned ON by a suitable gate signal, e.g., PWM) switches the bi-directional switch 10B to pass current through the transformer primary. Switch M1 keeps switch 10A ON.

During the negative half cycle, switch M1 (when turned ON by a suitable gate signal, e.g., PWM) enables the bi-directional switch 10A to pass current through the transformer primary in the opposite direction. Switch M2 keeps switch 10B ON.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for converting power from an AC power source to DC power, the circuit comprising:

one or more bi-directional switches capable of conducting and blocking a current flow in both directions, each bi-directional switch including corresponding pairs of gates and sources;

one or more control switches coupled to a bi-directional switch to enable and disable the current flow through the bi-directional switch, the control switches being controlled by a signal voltage to turn a bi-directional switch ON by discharging a threshold voltage on one of the bi-directional switch gates and turning a bi-directional switch OFF when the threshold voltage is not discharged by the control switches; and a transformer having one or more primary windings and a secondary winding, each primary winding being coupled to one of the bi-directional switch sources, wherein the current flow through the primary winding is disabled when the current flow through the corresponding bi-directional switch source is disabled.

2. The circuit of claim 1, further comprising a rectifier coupled to the secondary winding for providing the DC power.

3. The circuit of claim 1, wherein the bi-directional switch is normally ON;

a negative bias must be applied between respective gates and sources of the bi-directional switch to keep the bi-directional switch OFF; and if one of the gates of the bi-directional switch is provided with a threshold voltage to turn the bi-directional switch OFF, the bi-directional switch is OFF and will block current passage through the bi-directional switch.

4. The circuit of claim 3, wherein the bi-directional switch a GaN HEMT device.

5. The circuit of claim 1, further comprising a clamp circuit for clamping a voltage to a gate of the bi-directional switch to which the control switch is connected, the voltage being clamped at a threshold voltage sufficient to turn the bi-directional switch OFF.

6. The circuit of claim 5, wherein the clamp circuit further comprises:
   a first diode connected in parallel with the control switch, wherein the anode of the first diode is connected to the source and the cathode to the drain of the control switch, the first diode clamping the voltage to a maximum allowable value on the gate of the bi-directional switch to which the control switch is connected; and
   a second diode connected in series with a current limiting resistor, wherein the anode of the second diode is coupled to the source of the switch for ensuring that a gate capacitance of the bi-directional switch is not discharged through a corresponding primary winding.

7. The circuit of claim 6, wherein the first diode and the control switch to which the first diode is connected are replaced by a single low voltage, low current device.

8. The circuit of claim 6, wherein the first diode is a Zener diode and the second diode is a low voltage diode or a switch.

9. The circuit of claim 5, further comprising a single bi-directional switch and first and second control switches connected to the bi-directional switch,
the first control switch connected to the bi-directional switch to turn ON the bi-directional switch to allow the current flow through the bi-directional switch and in a primary winding in a first direction and
a second control switch to turn ON the bi-directional switch to allow current flow through the bi-directional switch and in the primary winding in a second direction opposite the first direction.

10. The circuit of claim 9, further comprising first and second primary windings, respectively connected to the first and second control switches,
   the first primary winding being coupled between a first source of the bi-directional switch and the AC power source,
   the second primary winding being coupled between a second source of the bi-directional switch and the AC power source,
   wherein for each of the first and second control switches, a clamp circuit is connected between the source of the respective first and second control switch and the AC power source.

11. The circuit of claim 10, wherein the gates of the first and second control switches receive PWM signals for turning ON the bi-directional switch to allow the current flow through the bi-directional switch and in the first and second primary windings.

12. The circuit of claim 11, wherein the current flow enabled by the first control switch is in a first direction and in the current flow enabled by the second control switch is in a second direction, the second direction being opposite the first direction.

13. The circuit of claim 12, wherein the first and second primary windings properly generate the driving voltages on the bi-directional switch when the bipolar voltage from the AC power source is applied.

14. The circuit of claim 13, wherein
   during the positive half gate of the AC power source the first and the second control switches clamp the voltage at the first and second gates at a threshold voltage of the bi-directional switch, the first control switch driving the bi-directional switch ON and OFF, while the second control switch reverse conducts a bias current, thereby shorting the first gate to the first source; and
   during the negative half cycle of the AC power source the second control switch switches the bi-directional switch ON and OFF and the first control switch shorts the second gate to the second source.

15. The circuit of claim 14, wherein one properly biased first or second control switch drives the bi-directional switch.

16. The circuit of claim 5, further comprising:
   first and second bi-directional switches each connected to a respective control switch and further being connected to the AC power source; and
   first, second, and third series connected primary windings, the first primary winding being coupled to the drain of the control switch connected to the first bi-directional switch, the second primary winding being coupled to the drain of the control switch connected to the second bi-directional switch, wherein for each control switch connected to the first and second bi-directional switches, the clamp circuit is connected between the source of the respective control switch and the third primary winding.

17. The circuit of claim 16, wherein the gates of the control switches receive PWM signals for turning ON the corresponding first and second bi-directional switches to allow the current flow through the first bi-directional switch and in the first primary winding and through the second bi-directional switch and in the second primary windings.

18. The circuit of claim 16, further comprising two states, wherein
   for the first bi-directional switch
   in a first state, when voltage from the AC power source reaches a threshold voltage of the first bi-directional switch, the control switch connected to the first bi-directional switch is kept OFF, thereby turning the first bi-directional switch OFF;
   in a second state, when the control switch of the first bi-directional switch is turned ON, the gate of the connected bi-directional switch is discharged and maintained discharged, therefore maintaining the first bi-directional switch ON;
   for the second bi-directional switch
   in a first state, when voltage from the AC power source reaches a threshold voltage of the second bi-directional switch, the control switch connected to the second bi-directional switch is kept OFF, thereby turning the second bi-directional switch OFF; and
   in a second state, when the control switch connected to the second bi-directional switch is turned ON, the first gate of the connected bi-directional switch is discharged and maintained discharged, therefore maintaining the second bi-directional switch ON.

19. The circuit of claim 18, wherein the first and second control switches are driven in parallel.

20. The circuit of claim 1, wherein losses due to use of unidirectional devices in a front-end rectifier bridge are eliminated.

21. The circuit of claim 1, wherein a first gate of the bi-directional switch is connected to the source of the control switch and a first drain of the control switch corresponding to the first gate is connected to the source of the bi-directional switch.

22. A switching circuit for providing power to a reactive load impedance, the circuit comprising:
- a first bi-directional semiconductor switch of the depletion mode type having two source terminals and a respective gate terminal associated with each source terminal, the first control switch being turned OFF if at least one gate terminal is at a negative threshold voltage with respect to its source terminal;
- a second control switch coupled between one gate terminal and the respective source terminal to allow control of a voltage applied to the one gate terminal;
- a reactive load impedance in series with the source terminals of the first control switch, the reactive impedance and source terminals of the first control switch being adapted to be connected across a voltage source;
- a clamp circuit for clamping a voltage to the one gate at a threshold voltage to turn the first control switch OFF, the second control switch being controlled by a signal voltage to turn the first control switch ON by discharging the threshold voltage on the one gate of the first control switch and turning the first control switch OFF when the threshold voltage is not discharged by the second control switch.

* * * * *